(12) United States Patent
Sarangam et al.

(10) Patent No.: US 7,770,088 B2
(45) Date of Patent: Aug. 3, 2010

(54) TECHNIQUES TO TRANSMIT NETWORK PROTOCOL UNITS

(75) Inventors: Parthasarathy Sarangam, Portland, OR (US); Sujoy Sen, Portland, OR (US); Linden Cornett, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1008 days.

(21) Appl. No.: 11/468,572

(22) Filed: Aug. 30, 2006

(65) Prior Publication Data

US 2007/0127525 A1 Jun. 7, 2007

Related U.S. Application Data

(63) Continuation-in-part of application No. 11/292,770, filed on Dec. 2, 2005.

(51) Int. Cl.
*H03M 13/00* (2006.01)
(52) U.S. Cl. ........................... 714/758; 370/394
(58) Field of Classification Search ............... 714/758; 370/394
See application file for complete search history.

(56) References Cited

U.S. PATENT DOCUMENTS

| | | | | |
|---|---|---|---|---|
| 5,844,918 | A * | 12/1998 | Kato ........................... | 714/751 |
| 7,580,406 | B2 * | 8/2009 | Shah et al. .................... | 370/389 |
| 2003/0123389 | A1 * | 7/2003 | Russell et al. ................ | 370/230 |
| 2004/0158793 | A1 | 8/2004 | Blightman et al. | |
| 2005/0251676 | A1 | 11/2005 | Shah et al. | |
| 2005/0278459 | A1 * | 12/2005 | Boucher et al. .............. | 709/250 |
| 2006/0114909 | A1 | 6/2006 | Uzrad et al. | |
| 2006/0235977 | A1 * | 10/2006 | Wunderlich et al. .......... | 709/227 |
| 2008/0282043 | A1 * | 11/2008 | Yagi et al. .................... | 711/147 |
| 2009/0327113 | A1 * | 12/2009 | Lee et al. ....................... | 705/34 |

OTHER PUBLICATIONS

Ronald L. Dammann et al., U.S. Appl. No. 11/233,742, entitled "Techniques to Determine Integrity of Information," filed Sep. 23, 2005.
Doug Freimuth et al., "Server Network Scalability and TCP Offload", Proceedings of the USENIX Annual Technical Conference, pp. 209-222, Apr. 2005.
Greg Regnier et al., "TCP Onloading for Datacenter Services: Perspectives and Challenges," IEEE Computer Magazine, vol. 37, No. 11, pp. 48-58, Nov. 2004.
J. Satran et al., "Internet Small Computer Systems Interface (iSCSI)", Network Working Group, RFC 3720, cover page and sections 1, 10.1, 10.2, Appendix A 1 and Appendix B.4 (pp. 1, 9-10, 113-114, 209-210 and 217-218), Apr. 2004.
Microsoft Corporation, "Windows Network Task Offload," Located at http://www.microsoft.com/whdc/device/network/taskoffload.mspx, 4 pages, Dec. 4, 2001.
Broadcom Corporation, "BCM5708S Product Brief: 1000/2500BASE-X TCP Offload Engine, RDMA, iSCSI/iSER and Ethernet Controller with PCI-ExpressTM," Located at http://www.broadcom.com/collateral/pb/5708S-PB01-R.pdf, 2 pages, Nov. 17, 2004.

* cited by examiner

*Primary Examiner*—M. Mujtaba K. Chaudry
(74) *Attorney, Agent, or Firm*—Caven & Aghevli LLC

(57) ABSTRACT

Logic may issue a request to transmit a network protocol unit and instruct a network component to determine an integrity validation value over one or more portion of the network protocol unit. The logic may reserve one or more location in memory to store the determined integrity validation value. For example, the integrity validation value may be a cyclical redundancy checking (CRC) value.

30 Claims, 7 Drawing Sheets

TECHNIQUES TO TRANSMIT NETWORK PROTOCOL UNITS

PRIORITY CLAIM

This application is a continuation-in-part of U.S. patent application Ser. No. 11/292,770 entitled "TECHNIQUES TO DETERMINE AN INTEGRITY VALIDATION VALUE", filed Dec. 2, 2005, and claims the benefit of priority thereof.

FIELD

The subject matter disclosed herein relates to techniques to determine an integrity validation value for a network protocol unit requested to be transmitted.

RELATED ART

Data communications systems typically utilize techniques to verify the integrity of transferred information. In some cases, packets may be transmitted with an integrity value computed over the contents and the value can be used by the receiver of the packets to check the integrity of the packet. For example, to verify integrity of received packets, various protocols such as Remote Direct Memory Access (RDMA), Internet Small Computer System Interface (iSCSI), and Stream Control Transmission Protocol (SCTP) may use a calculation of cyclical redundancy checking (CRC) values over received packets as well as a comparison of determined CRC values with CRC values provided with the packets. For example, RDMA is described at www.rdmaconsortium.com as well as in "An RDMA Protocol Specification", Version 1.0 (October 2002). iSCSI is described for example at RFC 3720: Internet Small Computer Systems Interface (iSCSI) (April 2004). SCTP is described for example at The Internet Society RFC-3286, An Introduction to the Stream Control Transmission Protocol (SCTP) (May 2002) and revisions thereof.

BRIEF DESCRIPTION OF THE DRAWINGS

Embodiments of the present invention are illustrated by way of example, and not by way of limitation, in the drawings and in which like reference numerals refer to similar elements.

Note that use of the same reference numbers in different figures indicates the same or like elements.

DETAILED DESCRIPTION

Figure 1:
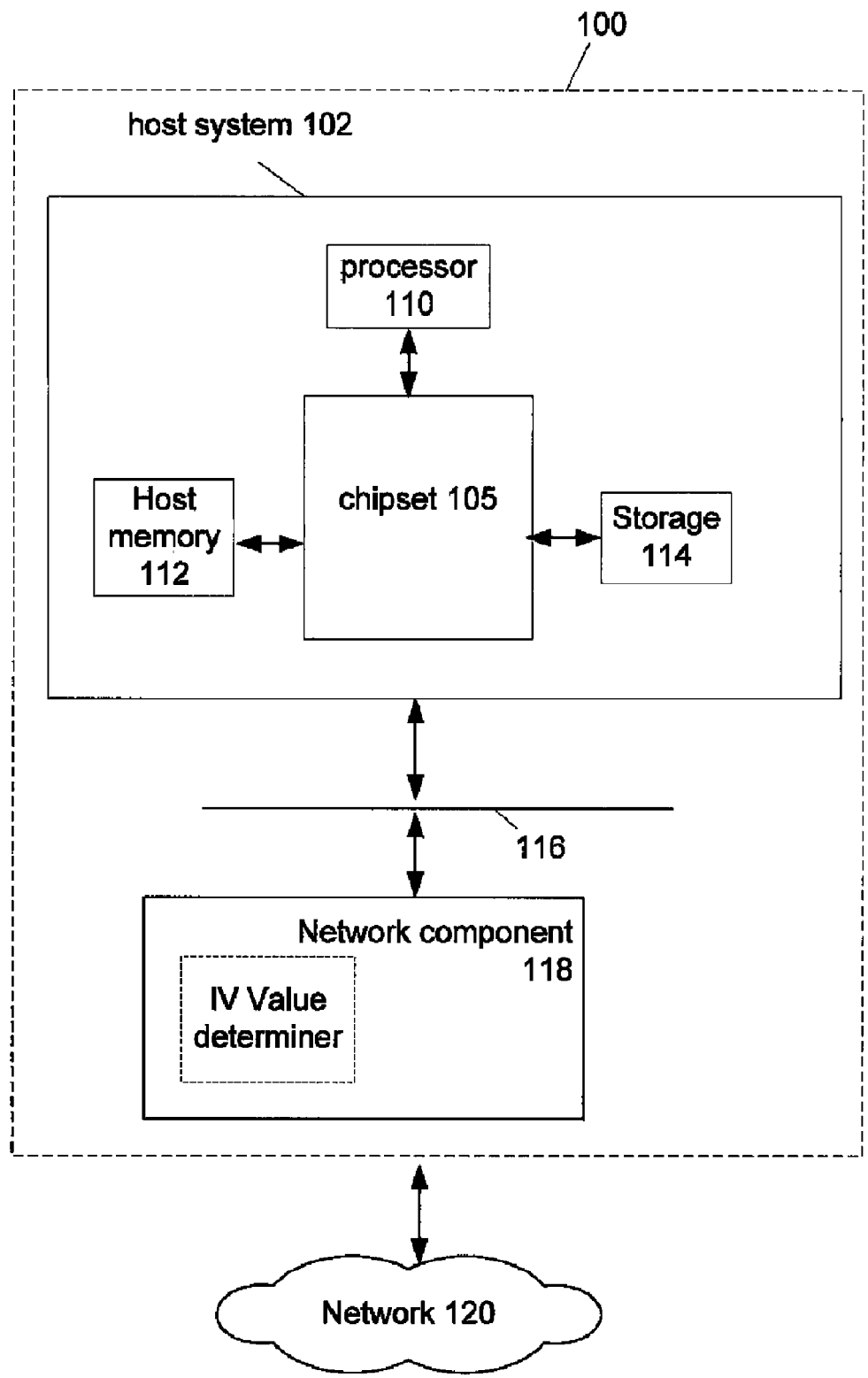
FIG. 1 depicts in block diagram form a computer system, in accordance with some embodiments of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In some embodiments, an iSCSI Protocol Data Unit (PDU) starts with a 48-byte header followed by a 4-byte header CRC value. In some embodiments, the header CRC value is followed by a data segment consisting of 0 to a maximum PDU size of data, followed by pad bytes, and a 4-byte data CRC value. A maximum size of an iSCSI PDU payload may be 16 mega bytes and it may be negotiated down by the target or initiator to 8 kilobytes. If markers are enabled, then the PDU may also contain marker bytes at fixed intervals (4 kilobyte intervals for instance).

In some known techniques, software executed by the host computes separate CRC values on the header and the data portions of PDUs, and inserts the computed CRC values to a scatter gather list for transfer to a network component for transmission.

Some embodiments of the present invention enable an iSCSI initiator logic (or other logic) to instruct a network component to determine integrity validation values for a portion of a PDU or other network protocol unit. An "integrity validation value" may be a CRC value, checksum, and/or other values determined based on any portion of a PDU. The determined integrity validation values may be included in a network protocol unit transmitted from the network component. As used herein, a "network protocol unit" may include any packet or frame or other format of information with header and payload portions formed in accordance with any protocol specification. In some embodiments, in connection with a request to transmit one or more PDU, the iSCSI initiator may reserve space in memory for integrity validation values that will be determined and inserted by a network component.

In some embodiments, a TCP stack logic used by the host may track a part of a PDU that is requested to be transmitted (i.e., beginning, middle, end, or entire PDU). The TCP stack logic can transfer requests to a network driver with information about which part of the PDU is requested to be transmitted. The TCP stack logic may also transfer a context identifier to the network driver logic so that the network driver logic can process partial PDUs. In some embodiments, the network driver logic used by the host may manage use of contexts by the network component. The network driver logic may also manage writing the determined integrity validation values to a reserved location in host memory at least so that retransmissions can be handled correctly. Although not a feature of any embodiment, the use of reserved location(s) to store determined integrity validation values may allow a TCP stack logic to transmit data without having to make sequence number adjustments.

In some embodiments, the host may include at least two flags in a descriptor that is provided to a network component to instruct the network component to: (1) determine an integrity validation value over a portion of information and/or (2) insert a determined integrity validation value in a data stream after a current segment of information. The descriptor may be a TCP Large Send Offload (LSO) descriptor. For example, TCP LSO is described at least in Regnier, Makineni, et al, "TCP Onloading for Datacenter Server: Perspectives and Challenges", IEEE Computer Magazine, Vol. 37, No. 11, pg 48-58, November 2004 and Freimuth, Hu, "Server Network Scalability and TCP Offload", Proceedings of the USENIX Annual Technical Conference, General Track, 2005.

Although not a necessary feature of any embodiment, some embodiments may reduce or avoid eviction of other useful information from the host cache.

Some embodiments permit the network component to determine integrity validation values during transfer of information from the host to the network component for transmission, thereby potentially enabling higher throughput while lowering the host processor utilization. For example, some embodiments permit determination of the integrity validation values on information that a data mover of the network component transfers from the buffers in the host to the network component for transmission.

In some embodiments, the network component may not be aware of the protocol that is used (e.g., iSCSI) or of the PDU format, for generating integrity validation values. Instructions to the network component described earlier concerning flags can be used to determine integrity validation values. Some embodiments can be used for any protocol that determines integrity validation values for data integrity validation purposes.

Some embodiments of the present invention may permit an integrity validation value to be determined on iSCSI PDUs split over multiple TCP segments. Some embodiments of the present invention may permit an integrity validation value to be determined over iSCSI PDUs split over multiple TCP LSOs or over multiple TCP transmit requests to the network component.

FIG. 1 depicts in block diagram form a computer system 100. Computer system 100 is a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance with any of the following protocols: Small Computer Systems Interface (SCSI), Fibre Channel (FC), and/or Serial Advanced Technology Attachment (S-ATA).

In some embodiments, chipset 105 may include data mover logic capable of performing transfers of information within host memory 112, or between network component 118 and host memory 112, or in general between any set of components in the computer system 100. As used herein, a "data mover" refers to a module for moving data from a source to a destination without using the core processing module of a host processor, such as processor 110, or otherwise does not use cycles of a processor to perform data copy or move operations. By using the data mover for transfer of data, the processor may be freed from the overhead of performing data movements. A data mover may include, for example, a direct memory access (DMA) engine as described herein. In some embodiments, data mover could be implemented as part of processor 110, although other components of computer system 100 may include the data mover.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCT Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more network protocol units to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

Some embodiments of host system 102 may include the capability to instruct network component 118 to determine integrity validation values for a portion of a PDU or other network protocol unit. In some embodiments, in connection with a request to transmit one or more PDU, SCSI initiator logic may reserve space in host memory for one or more integrity validation value(s) that will be determined and inserted by a network component.

Some embodiments of network component 118 may include the capability to determine integrity validation values for portions of information to be transmitted to a network. Such capability to determine integrity validation values is depicted as "IV value determiner". Descriptors transferred from host system 102 to network component 118 may instruct logic in the network component 118 whether to use the portion of information in determining an integrity validation value and whether to append a determined integrity validation value after the portion of information. Descriptors transferred from host system 102 to network component 118 may instruct logic in network component 118 as to which context to use at least in determining an integrity validation value and preparing information for transmission.

Network 120 may be any network such as the Internet, an intranet, a local area network (LAN), storage area network (SAN), a wide area network (WAN), or wireless network.

Network 120 may exchange traffic with network component 118 using the Ethernet standard (described in IEEE 802.3 and related standards) or any communications standard.

Figure 2A:
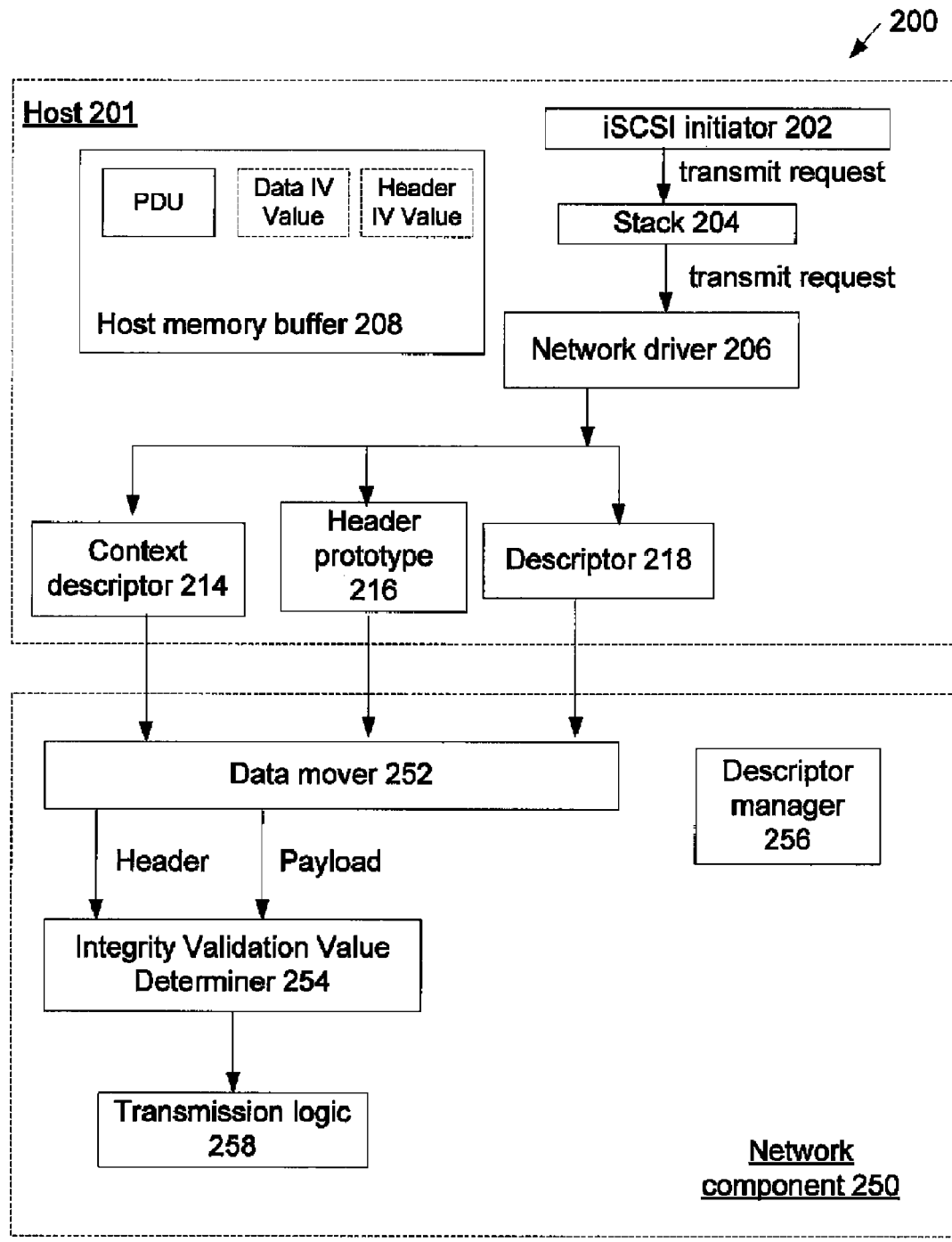
FIGS. 2A and 2B depicts logic elements that can be used to determine integrity validation values in a network component, in accordance with some embodiments of the present invention.

FIG. 2A depicts in block diagram format logic elements that can be used to determine an integrity validation value in a network component, in accordance with some embodiments of the present invention. Host 201 may include iSCSI initiator 202, stack 204, network component driver 206, and host memory buffer 208 as well as other logic that is not depicted such as but not limited to a processor and other input/output logic such as a bus interface.

Host memory 208 may store one or more PDU. Host memory 208 may store integrity validation values determined by network component 250 over header and/or data of a network protocol unit. Host memory 206 may also store integrity validation seed values. Seed values may be used when partial PDU portions are transmitted by network component. Determined integrity validation values may be included in retransmitted TCP segment or other type of network protocol unit.

iSCSI initiator 202 may issue a request to transmit a portion of a PDU or one or more PDUs in accordance at least with the iSCSI specification. iSCSI is described for example at RFC 3720: Internet Small Computer Systems Interface (iSCSI) (April 2004) and revisions thereof. iSCSI initiator 202 may create an iSCSI PDU header and fill in protocol fields for the PDU. iSCSI initiator 202 may also create a scatter-gather list (SGL) with scatter-gather elements (SGEs) pointing to the header, data, any markers in the data, and pad bytes.

In some embodiments, iSCSI initiator 202 is aware of whether the network component has the capability to determine an integrity validation value. For example, a layer of logic between iSCSI initiator 202 and driver 206 may indicate whether such capability is available. If a particular stream is to be transmitted using a network component that has the capability to determine an integrity validation value, iSCSI initiator 202 may offload determination of the integrity validation value for that stream to the network component.

If integrity validation value determination can be offloaded to the network component, iSCSI initiator 202 may reserve a space for the determined integrity validation value to be stored in host memory. In some embodiments, the reserved space is 4-bytes although other sizes may be used. For example, locations for integrity validation values for header and/or data portions may be reserved. In some embodiments, iSCSI initiator 202 may reserve the space before requesting transmission of a PDU.

iSCSI initiator 202 may transfer certain information to stack 204 pertaining to a transmit request on a per TCP/IP-connection basis and per transmit-request basis. For example, information transferred per TCP/IP connection may include whether determination of an integrity validation value over a header portion, data portion, or both are to be offloaded to the network component. Indication of whether determination of an integrity validation value over a header portion, data portion, or both are to be offloaded to the network component for a particular connection may be made either at the connection level or per individual transmit request. For example, information transferred per transmit request may include any or all of the following:

- Indication that a particular transmit request is associated with an iSCSI connection for which integrity validation value determination at the network component is requested.
- Indication whether the request refers to a beginning, middle, or end of a PDU or whether the complete PDU is referred-to in the request. This indication may be used if iSCSI initiator 202 is capable to request transmission of partial PDUs to TCP stack. If iSCSI initiator 202 only requests transmission of complete PDUs, this indication is not used.
- Header length. Network component may use this information to determine where the header integrity validation value is to be placed and in order to know where to start calculating the integrity validation value over the data portion.
- Reserved locations in host memory for each integrity validation value that the network component is to determine. For example, locations for integrity validation values for header and/or data portions may be reserved.
- Virtual address(es) in which integrity validation value(s) determined for data and/or header are to be stored. Network driver 206 may use this information to write the determined integrity validation values to the reserved location(s).

Stack 204 may provide transmit requests at least for TCP segments based in part on PDU transmit requests received from iSCSI initiator 202. In some embodiments, stack 204 may request transmissions of portions of the PDU using TCP segments in compliance with the TCP/IP protocol. However, stack 204 may request transmissions of portions of the PDU using other types of network protocol units. For example, the TCP/IP protocol is described at least in the publication entitled "Transmission Control Protocol: DARPA Internet Program Protocol Specification," prepared for the Defense Advanced Projects Research Agency (RFC 793, published September 1981) as well as revisions thereof.

In some embodiments, stack 204 may keep track of PDU boundaries among TCP segments. Tracking PDU boundaries may be used for passing down some per-request information because the end of a PDU is to coincide with the end of a TCP transmit request. In some embodiments, a transmit request from iSCSI initiator 202 may not request transmission of more than one PDU. Accordingly, in some embodiments, a transmit request ends when the end of transmission of one PDU occurs and a next PDU is handled in a separate transmit request.

Information transferred from stack 204 to network driver 206 may include:

- A flag indicating that a particular transmit request is an iSCSI transmit request and requesting determination of an integrity validation value by the network component. Indication is provided of the portion of the PDU (e.g., header, data, or both) over which an integrity validation value determination is requested.
- Stream identifier for each request for offload of integrity validation value determination. This can be used so that network driver 206 can efficiently instruct the network component to offload the integrity validation value determination in the case where stack 204 requests transmission of a PDU over multiple transmit requests.
- "iSCSI Orientation" may indicate whether a transmit request is for a complete PDU or a partial PDU (and if partial, whether it is the beginning, middle, or end of the PDU). Accordingly, "iSCSI Orientation" can be set to "First", "Middle", and/or "End".
- Pass-through of the virtual addresses of reserved locations for the header and/or data integrity validation values from iSCSI initiator 202. Network driver 206 can write the determined integrity validation value(s) to reserved locations after they are determined by the network component.
- Pass-through of the iSCSI header length from iSCSI initiator 202 so that network driver 206 can program the iSCSI context correctly without having to parse the transmit packet. This may be used only for the first request of a given PDU.

In some embodiments, network driver 206 can store the determined integrity validation values into reserved location(s) in host memory. If a transmitted TCP segment that includes an integrity validation value determined by the network component is lost, a retransmission of the TCP segment may take place. In the event of a retransmit, one or more stored determined integrity validation value may be used to retransmit a TCP segment.

In the case of fast retransmit under TCP, TCP may choose to retransmit a TCP segment before the original request has been completed by network driver 206. In such case, the retransmitted segment will not contain the correct integrity validation value. In some embodiments, stack 204 may not request retransmission of a particular TCP segment at least until after the integrity validation value determined by the network component is written to the reserved location(s).

In some embodiments, stack 204 may request transmission of portions of one or more PDU and may provide information to network driver 206 to identify PDU boundaries. In some embodiments, network driver 206 can break transmit requests into PDU boundaries before transmit requests are provided to the network component. Stack 204 may also use the integrity validation value determination feature of the network component for all transmit requests, regardless of size. However, stack 204 may not use the integrity validation value determination feature of the network component for retransmissions of any TCP segment. The iSCSI header itself may not be provided among multiple requests to the network component but rather, stack 204 may ensure that the first request for each PDU is at least long enough to contain the entire iSCSI header.

Network driver 206 may be a driver for the network component. Network driver 206 may be capable to initialize the network component and permit other logic to interface with the network component. Network driver 206 may generate one or more descriptor to transfer to the network component to describe the transmit request. For example, in response to transmit requests from stack 204 or another source, driver 206 may request transmit operations be performed by the network component.

For example, driver 206 may provide data and context descriptors to the network component. In some embodiments, separate descriptors may be used for PDU header and data portions. In some embodiments, data and header descriptors may be combined into a single descriptor.

Context descriptor 214 may include the following fields: indication that the context is for offload of integrity validation value determination, index pointing to a selected context, seed value used for determination of the integrity validation value over the data CRC (if offload is requested), seed value used for determination of the integrity validation value over the header CRC (if offload is requested), and size of the PDU header. A context descriptor may further include protocol related information.

A TCP header prototype 216 for each PDU or portion of a PDU may be provided by driver 206 to the network component. Network component may form the header for each TCP segment using the TCP header prototype. The TCP header prototype may include similar information as that in the context descriptor, a flag set to indicate that the context is for offload to the network component of integrity validation value determination, and an identifier of the context.

A descriptor 218 may reference transmission of PDU header and/or PDU data portion(s). Descriptor 218 may include the following fields: a flag set to indicate that the context is for offload to the network component of integrity validation value determination, an identifier of the context, an indication of where what portion of the PDU the descriptor refers to (i.e., beginning, middle, or end).

The following describes a possible manner for driver 206 to select a context in response to a request to transmit a complete PDU or a beginning portion of an incomplete PDU. In some embodiments, network driver 206 may select a context which is not in-use. Driver 206 may identify contexts that are in-use based on transmit requests from logic such as stack 204. Driver 206 may transfer a new context descriptor to identify the selected context to the network component.

The following describes a possible manner for driver 206 to generate one or more descriptor in response to a request to transmit a complete PDU. Network driver 206 sets "First & Last" in the "iSCSI orientation" field of the descriptor to indicate a complete PDU is to be transmitted. Network driver 206 programs the descriptor using the header length passed by stack 204. Network driver 206 programs the hardware descriptors using a seed value of zero. If offload of both header and data integrity validation value determination is requested, driver 206 generates a separate descriptor for the header integrity validation value and a separate descriptor for the data integrity validation value. In FIG. 2A, a descriptor referring to a header or data portion is shown as descriptor 218. Network component may write the values for both header and data integrity validation value to network driver 206 using respective header and data descriptors. Header or data descriptors may be exchanged between the host and the network component using a queue (not depicted).

A manner for driver 206 to generate one or more descriptor in response to a request to transmit a beginning portion of an incomplete PDU may be similar to that described with regard to generating one or more descriptor for a complete PDU except at least that driver 206 sets "First" in the "iSCSI orientation" field of the descriptor.

The following describes a possible manner for driver 206 to select a context in response to a request to transmit a middle or end portion of an incomplete PDU. Network driver 206 may select a context which is in-use and which was selected for a previous integrity validation value offload request on this stream. Network driver 206 determines if the selected context is still stored by the network component or accessible in the network component using a unique connection identifier passed down by stack 204. If the context descriptor which was used for the previous request is still stored by or is accessible to the network component, network driver 206 may not transfer a new context descriptor for this request to the network component. If the selected context was selected for use by a different stream or different PDU, driver 206 may program a new context descriptor with the seed value available from completion of a previous request completed for part of the same PDU.

The following describes a possible manner to generate one or more descriptor in response to a request to transmit a middle or end portion of an incomplete PDU. For a request to transmit a middle portion, network driver 206 sets "Middle" in the "iSCSI orientation" field of the data descriptor to indicate a middle portion of an incomplete PDU is to be transmitted. However, for a request to transmit an end portion, network driver 206 sets "End" in the "iSCSI orientation" field of the data descriptor to indicate an end portion of an incomplete PDU is to be transmitted. Network driver 206 programs the descriptors using the header length passed by stack 204. Network driver 206 programs the descriptor using a seed value stored in the reserved space for the integrity validation values. If offload of both header and data integrity validation value determination is requested, driver 206 may generate a separate descriptor for the header integrity validation value and a separate descriptor for the data integrity validation value. Network component may write the values for both header and data integrity validation value to network driver 206 using respective header and data descriptors. Header or data descriptors may be exchanged between the host and the network component using a queue (not depicted). In this case, driver 206 provides descriptors referring to the header and/or data portion of the network protocol unit to the network component as opposed to descriptors referring to the context as well header and/or data portions.

Referring next to network component 250, in some embodiments, a network component 250 includes data mover 252, integrity validation value determiner 254, descriptor manager 256, and transmission logic 258. Sources other than iSCSI initiator 202 may request determination of integrity validation values by network component. Although not depicted, network component 250 may store one or more context.

Data mover 252 may be used to read and write descriptors as well as contents of PDUs and other information between host 201 and network component 250. Descriptor manager 256 may write determined integrity validation values to host 201. For example, descriptor manager 256 may write determined integrity validation values for complete or partial PDUs into descriptors to be written back to host 201. For example, integrity validation values for integrity validation values determined over header and/or data portions may be transferred to network driver 206 using respective header and/or data descriptors. Header and/or data descriptors may be exchanged between the host 201 and network component 250 using a queue (not depicted).

Integrity validation value determiner 254 may determine integrity validation values over portions of a PDU specified in one or more descriptor provided from driver 206. For example, integrity validation value(s) may be determined over a header and/or data portion of a PDU. The determination of integrity validation values may be made based on information provided in one or more descriptor from host 201 such as but not limited to a specification of whether header or data portions are to have an integrity validation value determined and a seed value. In some embodiments, determination of an integrity validation value may use table look-ups, arithmetic-logic-unit operations, and/or calculations. Integrity validation value determiner 254 may be implemented among the same logic as data mover 252. In some embodiments, integrity validation value determiner 254 may be implemented in a separate logic from the data mover logic.

After integrity validation value determiner 254 determines integrity validation value(s), the determined integrity validation value(s) may be transferred back to driver 206 in at least one descriptor. For example, integrity validation values for integrity validation values determined over header and data portions may be transferred to network driver 206 using respective header and data descriptors. Header or data descriptors may be exchanged between the host and the network component using a queue (not depicted). Storing a partial integrity validation value determined by the network component in host memory or other location(s) may accommodate the case where the iSCSI context is overwritten before the next request associated with this stream is passed down.

Integrity validation value determiner 254 may provide to transmission logic 258 one or more PDU along with one or more integrity validation value determined by integrity validation value determiner 254. The position of insertion of determined integrity validation values may be specified by driver 206. Transmission logic 258 may include a media access controller (MAC) and a physical layer interface (both not depicted) capable of receiving packets from a network and transmitting packets to a network in conformance with the applicable protocols such as Ethernet as described in IEEE 802.3, although other protocols may be used. Transmission logic 258 may receive and transmit packets from and to a network via a network medium.

Figure 2B:
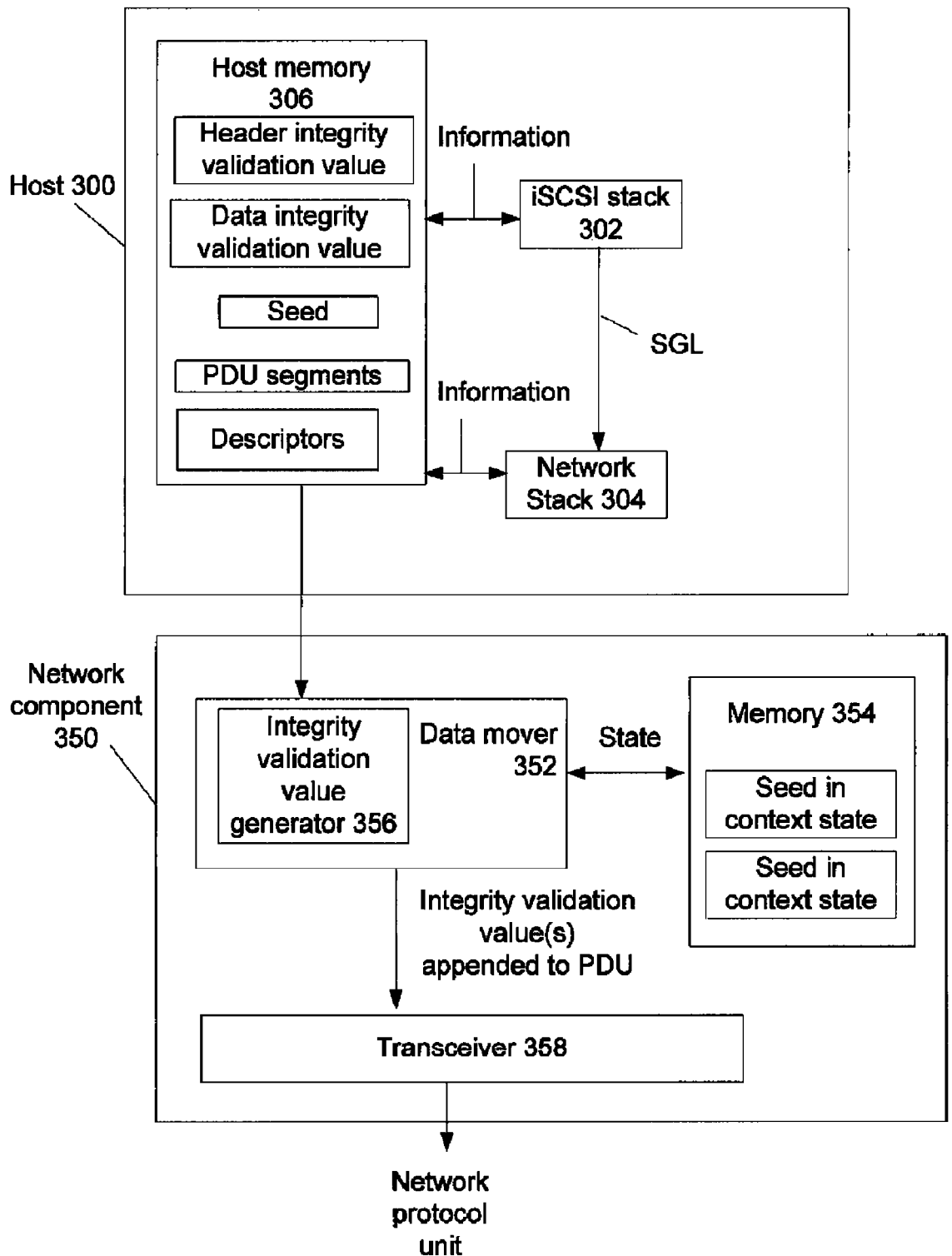

FIG. 2B depicts a block diagram of logic elements that can be used to determine an integrity validation value in a network component, in accordance with some embodiments of the present invention. Host 300 may include iSCSI stack 302, network stack 304, host memory 306 as well as other logic that is not depicted such as but not limited to a processor and other input/output logic such as a bus.

iSCSI stack 302 may create an iSCSI PDU header and fill in all the protocol fields for the PDU. The iSCSI stack may also create a scatter-gather list (SGL) with scatter-gather elements (SGEs) pointing to the header, the data, any markers in the data, and pad bytes. For example, each SGE may include: (1) an address in host memory 306 and length of information to which the SGE refers; (2) a compute ("C") flag; and (3) an append ("A") flag. For example, the information may include a PDU segment. For example, a SGE may be provided for each segment of a PDU. For example, there may be a header SGE, data SGE, and pad SGE.

In some embodiments, by using the C and A flags, an iSCSI stack can control whether a network component determines an integrity validation value over a PDU segment, and can control a position in a transmission stream where the network component inserts a determined integrity validation value. In some embodiments, any protocol other than iSCSI may be used.

In some embodiments, when the C flag is 1, network component 350 determines an incremental integrity validation value over the segment pointed to by a descriptor; whereas when the C flag is 0, network component 350 does not consider the segment pointed to by this descriptor during incremental integrity validation value determination.

In some embodiments, when the A flag is 1, network component 350 appends the current determined integrity validation value after the segment pointed to by the descriptor and may reset its integrity validation value to the initial value; whereas when the A flag is 0, network component 350 does not append the current integrity validation value after the PDU segment pointed to by the descriptor but may carry forward the integrity validation value for incremental integrity validation value determination.

Network stack 304 may convert SGEs into TCP LSOs or other formats. Network stack 304 may incorporate instructions from C and A flags from each SGE into the TCP LSO. In some embodiments, network stack 304 may include an integrity validation seed value in the TCP LSO. A TCP LSO may refer to a sequence of descriptors that point to the template TCP header and the TCP payload SGL and may incorporate C and A flags described earlier.

In some embodiments, network stack 304 may request transmit of TCP segments in compliance with TCP/IP.

Host memory 306 may at least store descriptors (e.g., provided by network stack 304) as well as other information such as but not limited to segments of PDUs as well as header and/or data integrity validation values determined by network component 350 and transmitted in a network protocol unit. Host memory 306 may also store integrity validation seed values.

In some embodiments, a network component 350 includes data mover 352, memory 354, integrity validation value generator 356, and transceiver 358. Data mover 352 may read at least one TCP LSO from host 300. For example, network component 350 may poll for at least one new TCP LSO from host memory 306 or may receive a request (e.g., interrupt) to retrieve at least one new TCP LSO from host memory 306. The TCP LSO may refer to descriptors stored in host memory 306. Based on the TCP LSO, data mover 352 may locate and retrieve associated descriptors from host memory 306. Based on the descriptors, data mover 352 may locate and retrieve associated PDU segments from host memory 306.

Integrity validation value generator 356 may be implemented among the same logic as data mover 352. In some embodiments, integrity validation value generator 356 may be implemented in a separate logic from the data mover logic. In some embodiments, the descriptors retrieved by data mover logic control operations of integrity validation value generator 356. Based on instructions from C and A flags transferred in the TCP LSO, integrity validation value generator 356 may determine integrity validation values and/or append a determined integrity validation value.

In some embodiments, integrity validation value generator 356 may determine an integrity validation value over each segment for which a C flag indicates an integrity validation value should be determined over the segment. Integrity validation value generator 356 may append the determined integrity validation value after the segment for which the A flag indicates that the integrity validation value is to be appended after the PDU segment. In some embodiments, determination of an integrity validation value may use table look-ups, arithmetic-logic-unit operations, and/or calculations.

TCP may split the transmission of a single iSCSI PDU into multiple transmit requests (for example into multiple TCP LSOs). In order for integrity validation value generator 356 to determine an integrity validation value, availability of the entire iSCSI PDU may be desirable. In some cases, a single LSO describes an entire PDU completely. However, in some cases, processing of an iSCSI PDU is described across multiple LSOs. In some cases, it is desirable to use an integrity validation value determined for a PDU segment as an integrity validation seed value for determination of an integrity validation value of a next segment of the PDU regardless of when the PDU is described in more than one LSO.

For a first segment of a PDU, an initialization seed may be used by network component 350 as a seed value. For example, the initialization seed may be stored in host memory 306 or memory 354 in network component 350. For example, the initialization seed may be defined by a relevant standard such as but not limited to iSCSI.

An integrity validation value determined for a segment may be used as a seed for a next segment. For example, for a PDU to be processed over multiple LSOs, a determined integrity validation value for a portion of the PDU may be used as a seed value for another part of the PDU. In some implementations, an integrity validation value determined for an LSO may be used as a seed value for a subsequent LSO.

In some embodiments, network stack 304 tracks where the integrity validation seed value is located (e.g., location in host memory 306 and/or location in memory 354). In some embodiments, the stack knows whether an integrity validation seed value is in memory of network component 350 because the stack controls writes to memory of network component 350. In some embodiments, network stack 304 may track whether network component 350 should use an integrity validation value determined from a previous LSO as a seed value.

In some embodiments, an integrity validation seed value is stored in a relevant context state for the connection in memory 354 of network component. The context state may indicate connection information such as but not limited to TCP state.

Network stack 304 may instruct network component 350 through an LSO whether to retrieve a seed from host memory 306 or memory 354 in network component 350. For example, in FIG. 2, the seed is shown as "Seed" (in host memory 306) and "Seed in context state" (in memory 354). For example, host 300 may use a TCP LSO control descriptor to provide an integrity validation seed value to network component 350, a control descriptor to provide a pointer to an integrity validation seed value in host memory 306, or a control descriptor to provide a pointer to a location in a memory location in memory 354 of network component 350 of an integrity validation seed value.

In some embodiments, after completion of processing each LSO, network component 350 may store a determined integrity validation value into memory 354 in network component 350. After completion of processing each LSO, network component 350 may transfer an LSO completion descriptor to network stack 304 indicating completion of the LSO as well as providing the determined integrity validation value. In some embodiments, network stack 304 may instruct network component 350 where to store the determined integrity validation value in host memory 306.

Writing back the determined integrity validation value to host memory 306 may be useful during segmentation of PDUs as well as in the case of TCP retransmission. In some instances, Ethernet packets are lost and a transmitter of packets is to retransmit lost packets. If a PDU is transmitted over multiple Ethernet packets, and the last or one of the last of the multiple Ethernet packets is lost or corrupted, then an integrity validation value may need to be retransmitted. However, the PDU segments over which the integrity validation value was determined may not be stored by the transmitter. In some embodiments, the header integrity validation value and/or data integrity validation value determined over segments of the PDU may be stored into host or network component memory. Accordingly, if a packet with a header or data integrity validation value for at least one PDU is to be re-transmitted then the header or data integrity validation value is available to be re-transmitted.

In some embodiments, the header and/or data integrity validation value is stored in host memory 306 until an acknowledgement message is received from the receiver of the Ethernet packet that contained the header or data integrity validation value. For example, in FIG. 2, a stored header integrity validation value is shown as "Header integrity validation value" whereas a stored data integrity validation value is shown as "Data integrity validation value". In some embodiments, the header and/or data integrity validation value may be stored in memory 354.

After receiving an acknowledgement message, the header and/or data integrity validation value in the Ethernet packet that contained the relevant header and/or data integrity validation value stored in host memory 306 and for which an acknowledgement message was received may be available to be overwritten. Writing the integrity validation value to memory may ensure that TCP segment is retransmitted with the correct iSCSI integrity validation value. Network stack 304 may keep track of the current integrity validation value for each iSCSI payload while it is transmitted.

Data mover 352 may provide to transceiver 358 PDU segments along with inserted integrity validation values determined by integrity validation value generator 356. Transceiver 358 may include a media access controller (MAC) and a physical layer interface (both not depicted) capable of receiving packets from a network and transmitting packets to a network in conformance with the applicable protocols such as Ethernet as described in IEEE 802.3, although other protocols may be used. Transceiver 358 may receive and transmit packets from and to a network via a network medium.

Figure 3A:
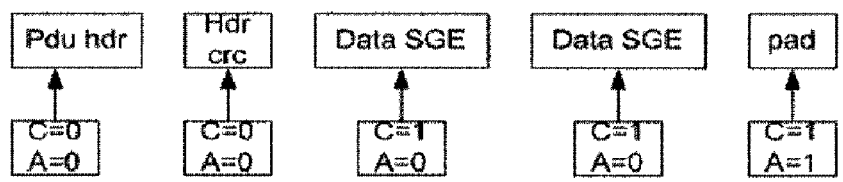
FIGS. 3A to 3C depict examples in accordance with some embodiments of the present invention.

FIG. 3A depicts an example in which a data integrity validation value is generated by a network component over multiple segments of a PDU. In this example, C and A flags are zero for the PDU header and header integrity validation value. The C flag being zero indicates that no integrity validation value is to be determined over the PDU header and header integrity validation value. The A flag being zero indicates that no integrity validation value is to be appended after any of the PDU header and header integrity validation value. In this example, a header integrity validation value may have been generated in a host by a TCP stack or iSCSI stack or by another source.

In this example, the C flag is set to 1 whereas the A flag is set to 0 for two consecutive data scatter gather element (SGE) segments of the PDU. Accordingly, a integrity validation value is determined over the two consecutive data SGEs. In other examples, an integrity validation value may be determined over other numbers of SGEs. Further, the C and A flags are set to 1 for the PDU pad segment. Accordingly, an integrity validation value is further determined over the PDU pad segment and the determined integrity validation value is appended after the PDU pad segment. In this example, the integrity validation value may be determined over the two consecutive data SGEs as well as the pad segment and appended after the PDU pad segment for transmission.

In some embodiments, the integrity validation value determined over the first data SGE is provided as a seed value for determining an integrity validation value over the second data SGE. The integrity validation value determined for the second data SGE may be provided as a seed value for determining the integrity validation value of the pad.

Figure 3B:
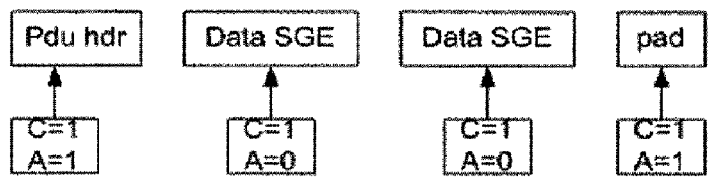

FIG. 3B depicts an example in which both data integrity validation value and header integrity validation value are generated by a network component. In this example, the C flag is set to 1 and the A flag is set to 1 for the PDU header so that a integrity validation value (header integrity validation value) is determined over the PDU header and appended after the PDU header for transmission. In this example, the C flag is set to 1 whereas the A flag is set to 0 for the two consecutive data SGEs. The C and A flags are set to 1 for the PDU pad segment. A integrity validation value may be determined over the two consecutive data SGEs and the PDU pad segment and appended after the PDU pad segment in a similar manner as that described with regard to FIG. 3A.

Figure 3C:
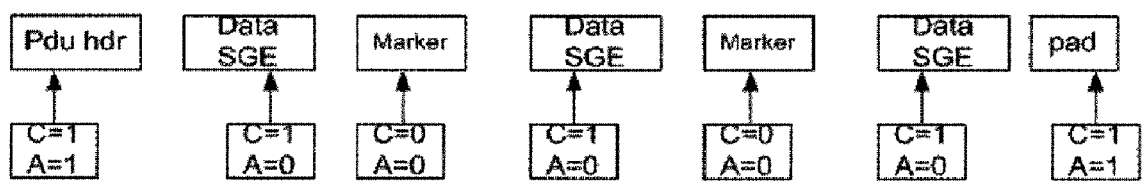

FIG. 3C depicts an example in which a data integrity validation value and header integrity validation value are generated by a network component but markers present in a PDU are not considered during determination of the integrity validation values. In this example, the C flag is set to 1 and the A flag is set to 1 for the PDU header so that an integrity validation value (header integrity validation value) is determined over the PDU header and appended after the PDU header for transmission. In this example, the C flag is set to 1 whereas the A flag is set to 0 for the two data SGEs but the C and A flags are set to 0 for the marker between the two data SGEs and for the marker following the second data SGE. The C and A flags are set to 1 for the PDU pad segment. An integrity validation value may be determined over the two data SGEs and the PDU pad segment and appended after the PDU pad segment in a similar manner as that described with regard to FIG. 3A. In this example, the markers are not considered during the determination of any integrity validation value.

Figure 4:
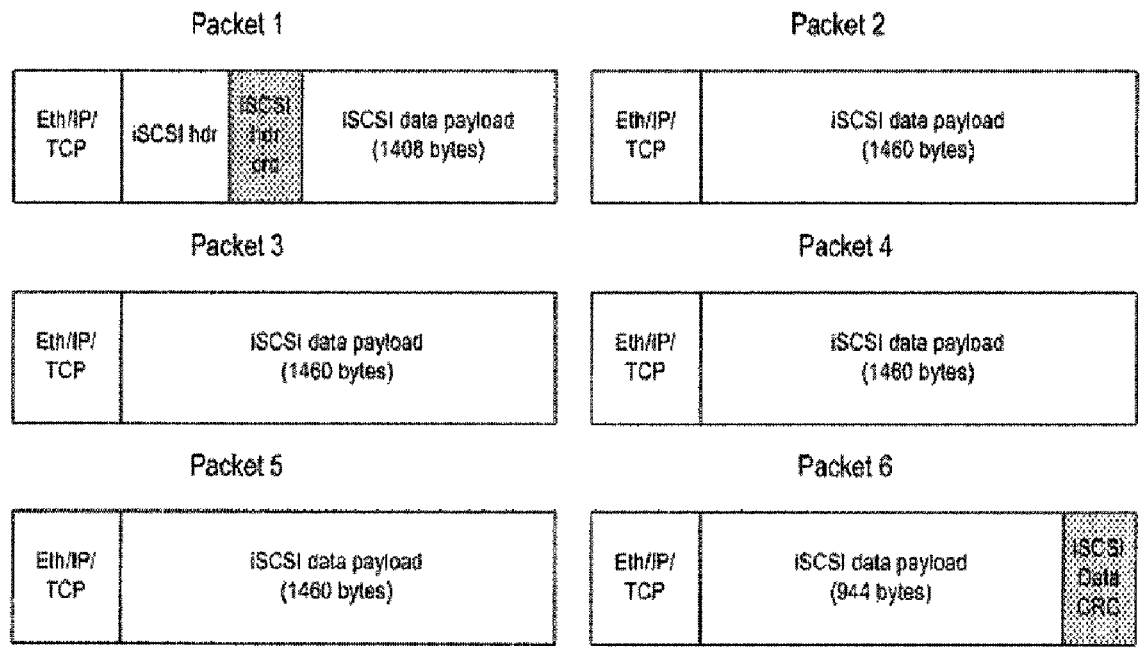
FIG. 4 shows an example of segments transmitted over multiple network protocol units.

FIG. 4 shows an example of PDU segments transmitted over multiple Ethernet packets. FIG. 4 shows the TCP packets on a wire generated by the network component for an iSCSI PDU with the header and data integrity validation value selectively determined by a network component inserted into appropriate positions in the stream. The example of FIG. 4 shows an 8 kilobyte iSCSI PDU with no markers and a TCP payload of maximum 1460 bytes per Ethernet frame.

Figure 5:
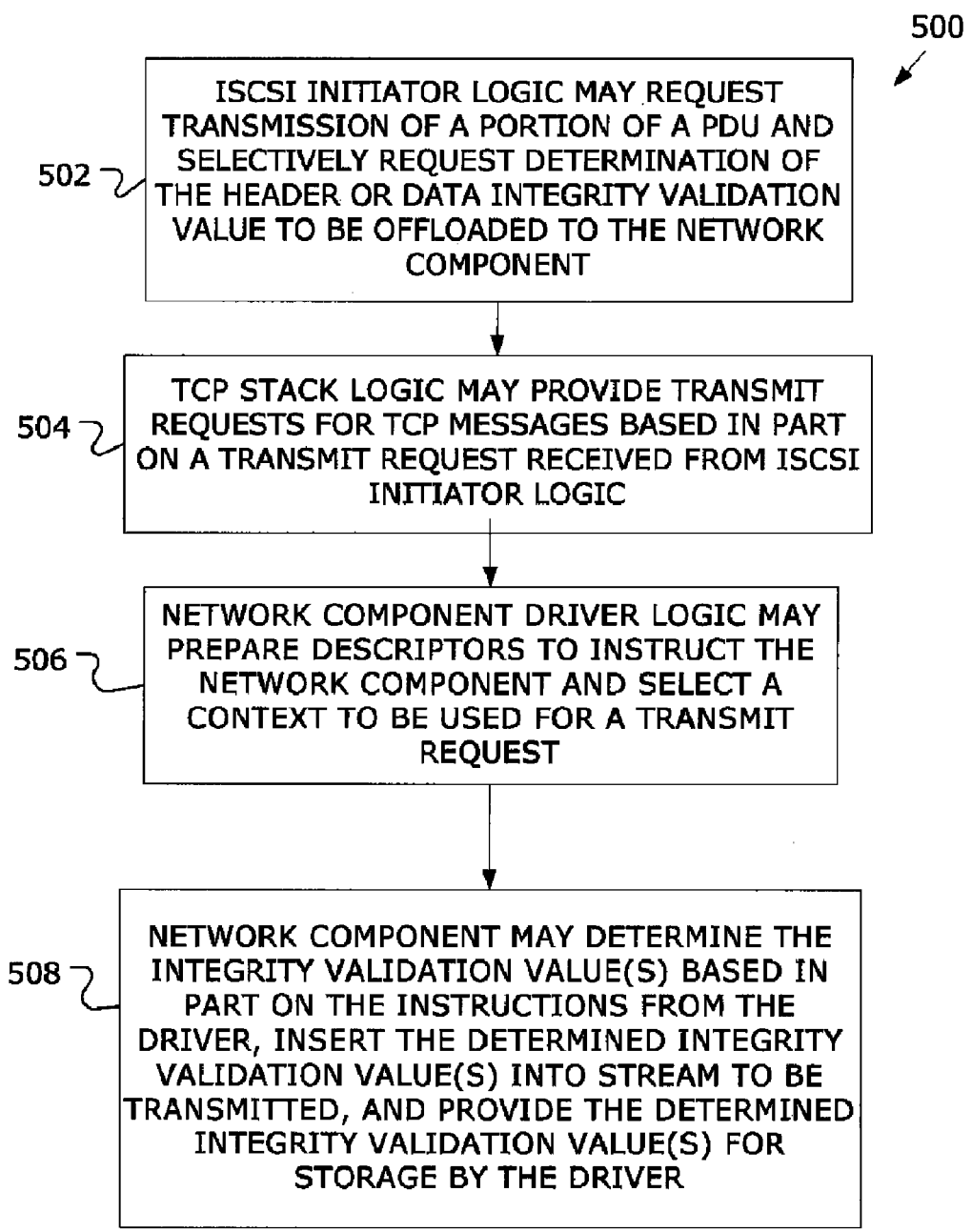
FIGS. 5 and 6 depict flow diagrams of example processes that can be used in embodiments of the present invention.

FIG. 5 depicts a flow diagram of a process capable to determine an integrity validation value of a network protocol unit, in accordance with some embodiments of the present invention. For example, the process can be used by the logic described with respect to FIG. 2A to determine integrity validation values and to request transmission of network protocol units with the determined integrity validation values.

In block 502, an iSCSI initiator logic may request transmission of at least one iSCSI PDU or a portion of an iSCSI PDU (e.g., beginning, middle, or end portion) and may request determination of an integrity validation value. If integrity validation value determination can be offloaded to the network component, iSCSI initiator logic may reserve a space for the determined integrity validation value to be stored in host memory. For example, locations for integrity validation values for header and/or data portions may be reserved. In connection with the transmit request, the iSCSI initiator may provide information such as but not limited to the location of the PDU in memory to be transmitted, request to determine integrity validation values for header and/or data portions in the network component, portion of the PDU to be transmitted (e.g., beginning, middle, or end portion), length of PDU header, reserved location in host memory for each integrity validation value that the network component is to determine, and/or virtual address in which integrity validation value determined for data and header is to be stored.

In block 504, TCP stack logic may provide transmit requests for TCP segments in compliance with TCP/IP based in part on a transmit request received from iSCSI initiator logic. TCP stack logic may request transmission of other types of network protocol units based on a transmit request of at least a portion of an iSCSI PDU. TCP stack logic may keep track of PDU boundaries among TCP segments. In some embodiments, a transmit request from TCP stack includes at most one PDU and accordingly. If multiple PDUs are to be transmitted, the requests to transmit the PDUs may be made over multiple requests. In connection with the request to transmit TCP segments, TCP stack logic may transfer any of the following: information provided from iSCSI initiator logic and a stream identifier for each request for offload of integrity validation value determination. The stream identifier can be used so that network driver logic can efficiently instruct the network component to offload the integrity validation value determination in the case where TCP stack logic requests transmission of a PDU over multiple transmit requests.

In block 506, a network component driver logic may prepare descriptors to instruct the network component and select a context to be used for a transmit request. For example, the descriptor fields may include at least a header length, seed value, and identifier of a portion of PDU being transmitted (e.g., entire, beginning, middle, or end). In some embodiments, descriptors may include data and context descriptors. For a request to transmit an entire PDU or a beginning of a PDU, the seed value may be zero. For a request to transmit a middle or end portion of a PDU, the seed value may be that determined in a completed previous transmit request for part of the same PDU. For example, a context may be selected based in part on the portion of a PDU to be transmitted. For a request to transmit an entire PDU or a beginning of a PDU, a context that is not in-use may be selected. For a request to transmit a middle or end portion of a PDU, a context that is in-use and used for a previous integrity validation value determination offload request and for the same connection may be selected. If the desired in-use context is available for use, a context descriptor is not provided by the driver to the network component. If the desired context is not available, then another context may be selected and a context descriptor for the selected context is provided by the driver to the network component.

In block 508, a network component may determine the integrity validation value(s) based in part on the instructions from the driver, insert the determined integrity validation value(s) into the stream to be transmitted, and provide the determined integrity validation value(s) for storage by the driver. The driver may store the determined integrity validation value(s) into host memory at allocated storage locations for integrity validation values determined over header and/or data portions of a PDU.

Figure 6:
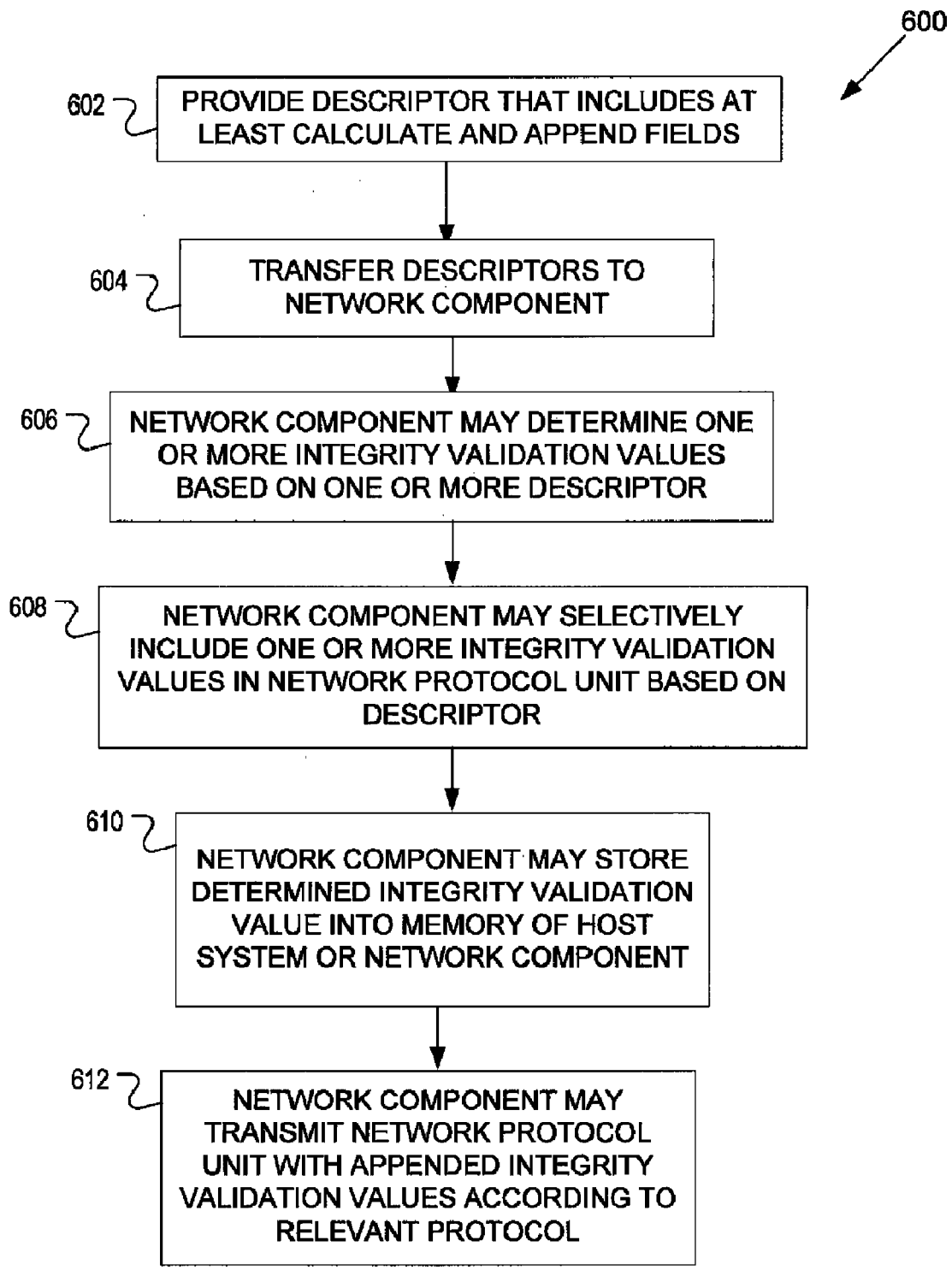

FIG. 6 depicts a flow diagram of an example process 600 that can be used in embodiments of the present invention. For example, process 600 can be used by the logic described with respect to FIG. 2B to determine integrity validation values and to request transmission of network protocol units with the determined integrity validation values.

In block 602, logic used by a host computer may provide a descriptor that at least identifies PDU segments by starting address and length in a memory as well as include at least determine and append fields and may include a seed. For example, such logic may be a TCP stack or iSCSI compliant stack or other logic compatible with other protocols. For example, the determine field may instruct logic in the network component whether to use the portion of information in determining a integrity validation value whereas the append field may instruct logic in the network component whether to append the integrity validation value after the portion of information. In some embodiments, the descriptor may also include or identify a location of a seed value to use to determine the integrity validation value.

In block 604, the logic may transfer the descriptors to the network component. In some embodiments, a data mover logic of the network component may transfer the descriptors from the host computer to the network component.

In block 606, the network component may determine one or more integrity validation values based on one or more descriptor. For example, the determine field of the descriptor may be used to indicate whether the network component is to determine an integrity validation value over a segment of information. For example, the integrity validation value may be a CRC value, although other values may be determined. For example, the information may include a portion of a PDU that is to be transmitted to a receiver through a network.

In block 608, the network component may selectively insert one or more integrity validation values for a network protocol unit based on the descriptor. For example, the append field of the descriptor may be used to indicate whether a determined integrity validation value is to be inserted after the portion of information. For example, an integrity validation value may be determined over multiple segments of information and appended after multiple segments of information.

In block 610, the network component may store the determined integrity validation value into memory of the host system or the network component. For example, the stored integrity validation value may be used as a seed for subsequent determination of an integrity validation value. For example, the stored integrity validation value may be transmitted in the event a retransmit of the determined integrity validation value is requested.

In block 612, the network component may transmit a network protocol unit with appended integrity validation values according to the relevant protocol. Any protocol may be used such as but not limited to Ethernet.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   issuing an instruction from a first logic to a second logic to transmit a portion of a network protocol unit, wherein the instruction includes a request for a network component to determine at least one integrity validation value based on the portion of the network protocol unit and wherein the first logic is to reserve at least one memory location to store the determined at least one integrity validation value;

issuing an instruction from the second logic to a third logic to transmit the portion of the network protocol unit over at least one TCP segment, wherein the second logic keeps track of boundaries of the network protocol unit; and issuing an instruction from the third logic to a network component to transmit at least one TCP segment, wherein the third logic selects a context for use and provides information related to determination of the at least one integrity validation value.

2. The method of claim 1, wherein one of the at least one integrity validation value comprises a cyclical redundancy checking value.

3. The method of claim 1, wherein the network protocol unit comprises an iSCSI compliant protocol data unit.

4. The method of claim 1, wherein the first logic identifies whether an integrity validation value is to be determined over any of a header or data portion of the network protocol unit.

5. The method of claim 1, wherein the first logic identifies a portion of the network protocol unit to be transmitted and wherein the portion is selected from a group consisting of entire, beginning, middle, and end portion.

6. The method of claim 1, wherein the first logic identifies the reserved at least one memory location to the second logic.

7. The method of claim 1, wherein the third logic selects a context for use based in part on a portion of the network protocol unit requested to be transmitted.

8. The method of claim 7, wherein the third logic selects a context for use that is not in-use for either of a request to transmit a complete network protocol unit or beginning of a network protocol unit.

9. The method of claim 7, wherein the third logic selects a context for use that is in-use for either of a request to transmit a middle or end portion of a network protocol unit.

10. The method of claim 1, wherein the information related to determination of the at least one integrity validation value comprises a seed value.

11. The method of claim 1, further comprising:
transferring the determined at least one integrity validation value from the network component to the third logic; and
the third logic requesting the determined at least one integrity validation value to be written to the reserved at least one memory location.

12. A computer-readable medium that stores instructions which when executed by a machine cause the machine to:
issue an instruction from a first logic to a second logic to transmit a portion of a network protocol unit, wherein the instruction includes a request for a network component to determine at least one integrity validation value based on the portion of the network protocol unit and wherein the first logic is to reserve at least one memory location to store the determined at least one integrity validation value;
issue an instruction from the second logic to a third logic to transmit the portion of the network protocol unit over at least one TCP segment, wherein the second logic keeps track of boundaries of the network protocol unit; and
issue an instruction from the third logic to a network component to transmit at least one TCP segment, wherein the third logic is to select a context for use and to provide information related to determination of the at least one integrity validation value.

13. The computer-readable medium of claim 12, wherein the third logic is to request the determined at least one integrity validation value to be written to the reserved at least one memory location.

14. The computer-readable medium of claim 12, wherein one of the at least one integrity validation value comprises a cyclical redundancy checking value.

15. The computer-readable medium of claim 12, wherein the network protocol unit comprises an iSCSI compliant protocol data unit.

16. The computer-readable medium of claim 12, wherein the first logic identifies whether an integrity validation value is to be determined over any of a header or data portion of the network protocol unit.

17. The computer-readable medium of claim 12, wherein the first logic identifies a portion of the network protocol unit to be transmitted and wherein the portion is selected from a group consisting of entire, beginning, middle, and end portion.

18. The computer-readable medium of claim 12, wherein the first logic identifies the reserved at least one memory location to the second logic.

19. The computer-readable medium of claim 12, wherein the third logic selects a context for use based in part on a portion of the network protocol unit requested to be transmitted.

20. The computer-readable medium of claim 19, wherein the third logic selects a context for use that is not in-use for either of a request to transmit a complete network protocol unit or beginning of a network protocol unit.

21. The computer-readable medium of claim 19, wherein the third logic selects a context for use that is in-use for either of a request to transmit a middle or end portion of a network protocol unit.

22. The computer-readable medium of claim 12, wherein the information related to determination of the at least one integrity validation value comprises a seed value.

23. A system comprising:
a host comprising a processor and memory;
a storage device communicatively coupled to the host computer; and
a network component comprising a memory and logic to determine an integrity validation value, wherein the host includes first, second, and third logic, wherein:
the first logic is to issue an instruction to the second logic to transmit a portion of a network protocol unit, wherein the instruction includes a request for a network component to determine at least one integrity validation value based on the portion of the network protocol unit and wherein the first logic is to reserve at least one memory location to store the determined at least one integrity validation value,
the second logic is to issue an instruction to a third logic to transmit the portion of the network protocol unit over at least one TCP segment, wherein the second logic keeps track of boundaries of the network protocol unit, and
the third logic is to issue an instruction to the network component to transmit at least one TCP segment, wherein the third logic is to select a context for use and to provide information related to determination of the at least one integrity validation value.

24. The system of claim 23, wherein the third logic is to request the determined at least one integrity validation value to be written to the reserved at least one memory location.

25. The system of claim 23, wherein one of the at least one integrity validation value comprises a cyclical redundancy checking value.

26. The system of claim 23, wherein the network protocol unit comprises an iSCSI compliant protocol data unit.

27. The system of claim 23, wherein the first logic identifies whether an integrity validation value is to be determined over any of a header or data portion of the network protocol unit.

28. The system of claim 23, wherein the first logic identifies the portion of the network protocol unit to be transmitted and wherein the portion is selected from a group consisting of entire, beginning, middle, and end portion.

29. The system of claim 23, wherein the first logic identifies the reserved at least one memory location.

30. The system of claim 23, wherein the third logic selects a context for use based in part on a portion of the network protocol unit requested to be transmitted.

* * * * *